W. ERHARD.
AUTOMATIC FEEDER FOR TUBE PRESSES.
APPLICATION FILED MAY 29, 1920.

1,369,921.                                Patented Mar. 1, 1921.
                                               2 SHEETS—SHEET 1.

WITNESSES                                    INVENTOR
                                          WILLIAM ERHARD
                                                BY
                                                    ATTORNEYS

W. ERHARD.
AUTOMATIC FEEDER FOR TUBE PRESSES
APPLICATION FILED MAY 29, 1920.
1,369,921.
Patented Mar. 1, 1921.
2 SHEETS—SHEET 2.
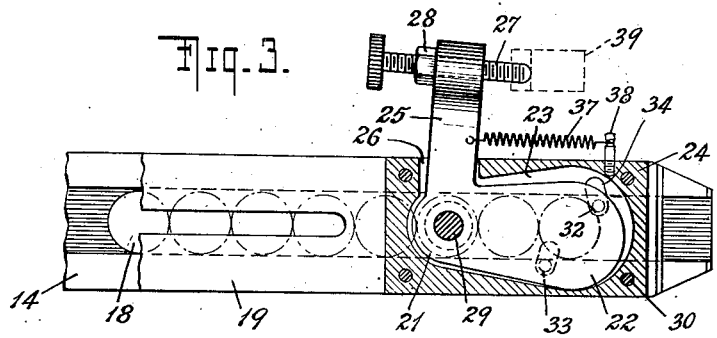
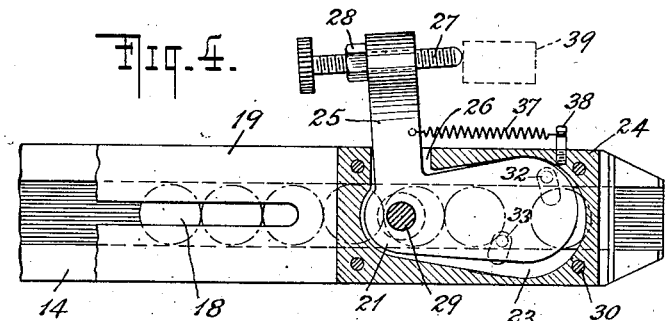
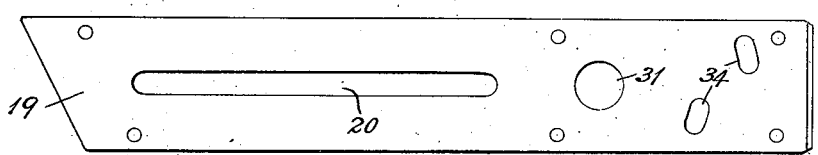
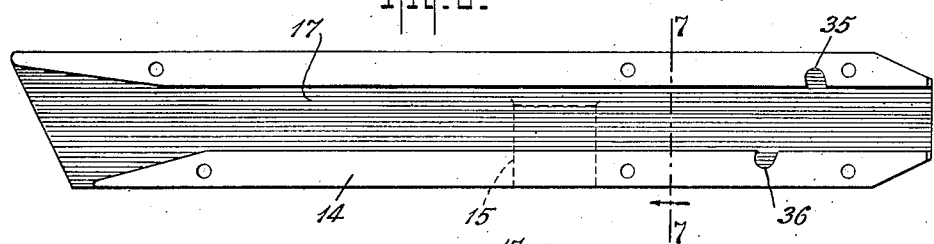
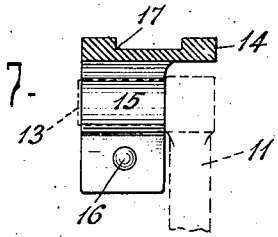
WITNESSES
INVENTOR
WILLIAM ERHARD
BY
ATTORNEYS

UNITED STATES PATENT OFFICE.

WILLIAM ERHARD, OF JERSEY CITY, NEW JERSEY.

AUTOMATIC FEEDER FOR TUBE-PRESSES.

1,369,921.   Specification of Letters Patent.   Patented Mar. 1, 1921.

Application filed May 29, 1920. Serial No. 385,127.

*To all whom it may concern:*

Be it known that I, WILLIAM ERHARD, a citizen of the United States, and resident of Jersey City, county of Hudson, and State of New Jersey, have invented certain new and useful Improvements in Automatic Feeders for Tube-Presses, of which the following is a specification.

My invention relates to that class of machines commonly known as tube presses and whereby compressible, collapsible tubes used, for instance, as containers for tooth pastes, shaving creams and the like are produced; such tubes are generally drawn from suitable metallic disks or plates of predetermined dimensions. The object of my invention is to provide a simple and efficient device whereby said disks or plates may be automatically fed to the machine in uninterrupted sequence and in a manner to prevent accidents to the operators, to prolong the life of the dies, to increase the production of the press and to do away with the necessity for any special skill on the part of the operators. The invention will be fully described hereinafter and the features of novelty will be pointed out in the appended claims.

Figure 1:
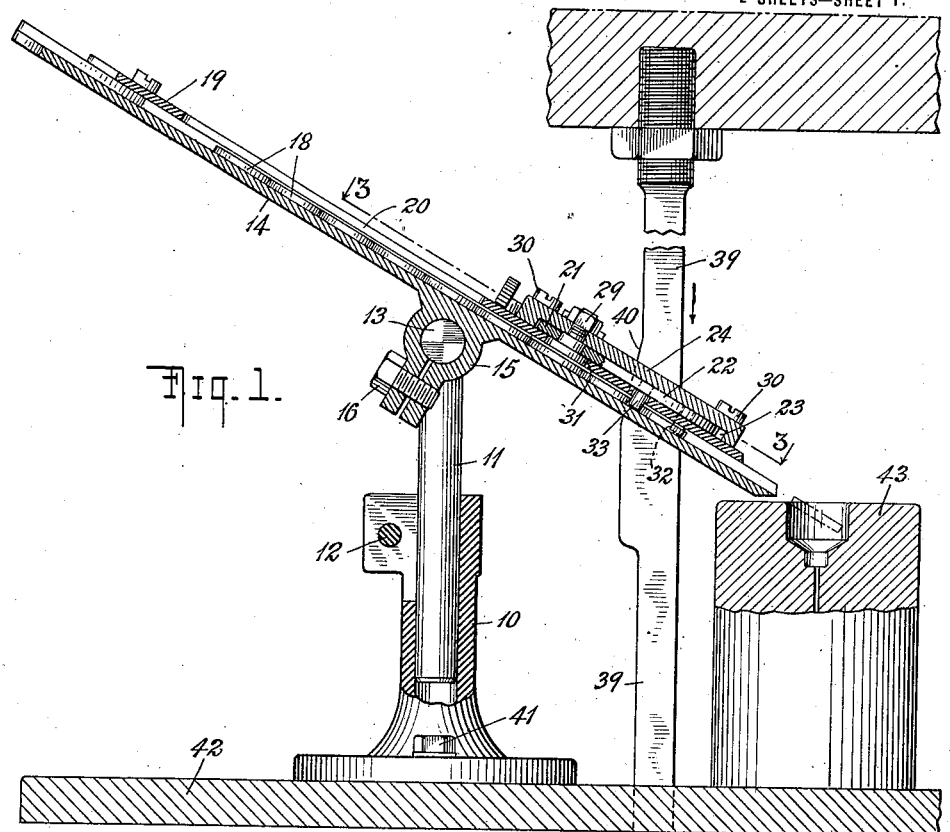
Figure 2:
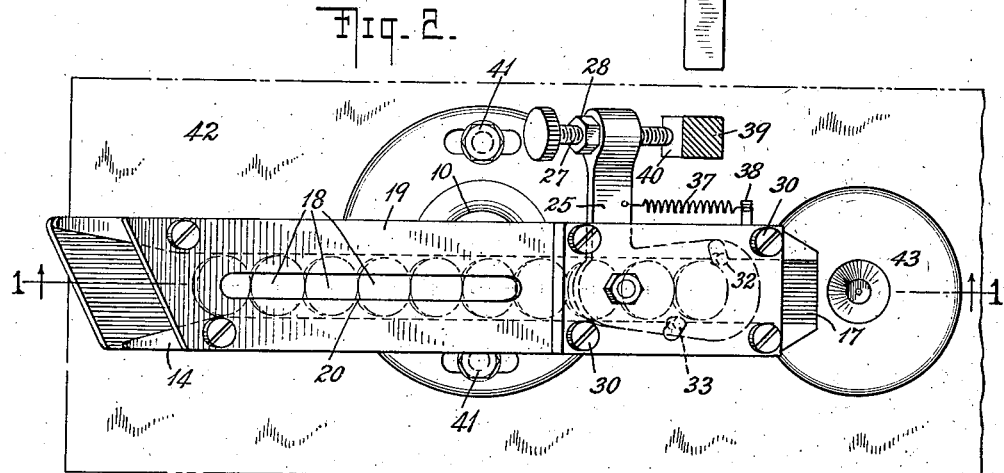

Without intending to define the limits of the invention, I will now explain a satisfactory embodiment thereof with reference to the accompanying drawings in which Figure 1 is a sectional elevation of the feeder on the line 1—1 of Fig. 2; Fig. 2 is a plan view thereof; Figs. 3 and 4 are fragmentary sectional views on the line 3—3 of Fig. 1, illustrating the parts in different positions; Fig. 5 is a face view of the cover of the device; Fig. 6 is a similar view of the chute or channel member which forms part of the feeder and Fig. 7 is a detail cross-section thereof on the line 7—7 of Fig. 6.

As shown in the illustrated example, the feeder comprises an upright support or stand 10 of suitable construction into which the supporting stem 11 extends as shown in Fig. 1, the stand being preferably provided with clamping means 12 of conventional form whereby said stem 11 is clamped against movement relatively to said stand. The stem 11 in the form shown, is provided at its outer end with a transverse member 13 on which the chute or channel member 14 is pivotally and adjustably mounted by means of an apertured lug 15 preferably constituting an integral part of said member 14 and fixed in position in any suitable manner as through the medium of a clamp screw or bolt 16.

The channel member 14 is formed with a channel 17 which extends throughout the length thereof and preferably has its inlet end flaring outwardly as shown, the remainder of said channel being of a width to slidably accommodate the metallic disks or plates 18 from which the tubes are drawn. A cover plate 19 is preferably secured upon the member 14 in registry with the major portion of the channel 17 and may be provided with a slot or the like 20 which serves as an opening through which to view said channel 17. The construction further includes a controlling mechanism which in the illustrated example comprises a bell-crank lever 21, the one member 22 of which lies within a recess 23 of a housing 24 and the other member 25 of which projects exteriorly of said housing through a slot 26 thereof and carries a projection in the form of an adjustable screw 27 fixed in place, for instance, by means of a lock nut 28. The bell-crank lever 21 is pivotally mounted upon a headed bolt 29 which is secured to the housing 24, the latter in its operative position being fastened upon the channel member 14 in surface engagement with the cover plate 19 by means of screws or the like 30; a suitable aperture 31 is provided in the cover plate 19 for the accommodation of the head of the bolt 29 as shown in Fig. 1.

The member 22 of the bell-crank lever 21 carries pins or lugs 32 and 33 which depend therefrom through slots 34 in the cover plate 19 into the channel 17 and in registry respectively with notches 35 and 36 in the opposite side walls of the channel 17; the arrangement is such that when one pin or lug 32 or 33 lies within its coöperating notch 35 or 36 and out of the channel the other pin or lug will project into the channel 17 in the path of the disks or plates 18 therein and vice versa. The pins 32 and 33 are located on the member 22 out of registry with each other, the pin 32 being adapted for projection in front of the terminal disk 18 and the pin 33 being movable into a position in front of the disk which immediately follows said terminal disk as shown in Fig. 2. A spring 37 having its one end secured to a stud 38 fixed upon the channel member 14 and its other end fastened to the member 24 of the bell-crank lever 21 serves to maintain the adjustable screw 27 in contact with the member 39 carrying a cam 40 and constituting a part of the press, said member 39 being vertically reciprocable by means of suitable mechanism in the operation of the press.

When the feeder is operatively combined with the press, the base of the stand 10 is secured by means of bolts 41 to a suitable part 42 of said press in a position to locate the exit end of the channel member 14 in delivery relation to the die 43 which forms part of said press and which may be of any conventional type. It will be understood that said channel member 14 occupies an inclined position, for instance, as shown in Fig. 1 and sufficiently steep to cause the disks 18, when unrestrained to travel downwardly in the channel 17 by gravity; the channel member 14 is fixed in its adjusted position by the clamp screw 16.

In operation the metallic disks or plates 18 are fed into the inlet end of the channel 17 of the member 14 by an attendant and slide down said channel until the initial disk is stopped by the pin 32 which, it will be understood, projects into said channel 17, at this stage, as shown in Figs. 2 and 3. As the tube press is actuated to perform its functions the member 39 will, at the proper time, be moved upwardly and by means of the cam 40 will exert a force on the adjustable screw 27 whereby the bell-crank lever 21 is pivotally operated against the tension of the spring 37. The movement of said lever 21 is in a direction to swing its member 22 upwardly from the position shown in Fig. 3 to the position shown in Fig. 4 and thus to shift the pin 32 into the notch 35 and out of the path of the terminal disk 18 which, being thereby released, drops by gravity from the channel 17 into the die 43 and is converted into a tube in the conventional manner. As the pin 32 is thus moved out of the channel 17 because of the described movement of the bell-crank member 22, the pin 33, for the same reason, is coincidentally moved out of the notch 36 into the channel 17 and into the path of the disk 18 which immediately follows the discharged terminal disk. In this way all of the disks excepting the previously mentioned terminal disk are held against downward movement in the channel 17 during the discharge of said terminal disk 18 as is clearly shown in Fig. 4. As the pin 33 moves from the notch 36 into the channel 17 it will contact with the terminal disk and by exerting a push thereon will start it on its way down the channel 17 and thus augment the action of gravity whereby the discharge of said terminal disk is facilitated and clogging of the channel is prevented.

In the continued operation of the press the member 39 will describe a downward movement and by carrying the cam 40 along will permit the spring 37 to swing the bell-crank lever 21 in a return direction thus restoring the parts to the position shown in Fig. 3. During this return movement the bell-crank member 22 swings downwardly from the position shown in Fig. 4 to the position shown in Fig. 3 and thus shifts the pin 33 back into the notch 36 and out of the channel 17 and at the same time moves the pin 32 out of the notch 35 and into said channel. In this way the disk 18 which previously has been held by the pin 33 and which is now the terminal disk, is released and slides down the channel 17 by gravity and followed by the succeeding disks until stopped by the pin 32. These operations are successively repeated and bring about an automatic and successive feeding of the disks 18 into the die or dies 43 at the proper time. The action of the feeder is very positive and uniform and automatically insures a proper supply of individual disks to the press without any attention on the part of the attendant other than that required to maintain a supply of disks in the channel 17; this introduction of the disks into the said channel may obviously be also automatic instead of manual if desired.

The feeder may be readily combined with or installed in existing machines and is simple in construction and of maximum efficiency in operation. Its use not only increases the productive output of the press but also does away with the necessity for skilled help as the operation of the feeder is entirely automatic and simply requires that the supply of disks or plates 18 be replenished either periodically or continuously in order that the discharge of said disks into the dies may be constant and without interruption during the operation of the press. Furthermore, by doing away with the necessity for manually feeding the disks to the dies and thereby taking the operator away from the vicinity of the press mechanism the danger of injury to the workers is done away with or at least greatly reduced; with the use of the feeder the wear and tear upon the dies is also decreased whereby the life thereof is materially increased.

Various changes in the specific form shown and described may be made within the scope of the claims without departing from the spirit of my invention.

I claim:

1. In a tube press, the combination of a receiving device into which individual metallic disks are introduced, a channeled member containing a series of said disks and having its exit end in delivery relation to said receiving device, a lever pivotally mounted upon said channeled member, means carried by said lever whereby the terminal disk is released for delivery to said receiving device and given impetus in the direction of delivery and whereby the next succeeding disk is held against movement in said channeled member and means constituting a part of the press whereby the lever is actuated.

2. A feeder comprising a member having a channel extending lengthwise thereof and arranged to contain a series of disks, a pivoted bell crank lever having its one member extending in registry with said channel and its other member projecting transversely beyond the same, devices projecting from said one member and arranged to be alternately moved into and out of said channel whereby the terminal disk is released for discharge and the succeeding disks are positively held against movement in said channel, the device whereby the latter is accomplished, being arranged to impact against the terminal disk to impart an impetus thereto in the direction of delivery, and means engaging said other member for actuating said lever.

3. A feeder comprising a member having a channel extending lengthwise thereof and arranged to contain a series of disks, a lever pivotally mounted upon said member, a projection on said lever whereby said series of disks are held and the terminal disk is released for discharge, a second projection of said lever whereby the succeeding disks are held against movement in said channel during the discharge of the terminal disk and the latter is given an impetus in the direction of delivery and means for actuating said lever.

4. A feeder comprising a member having a channel extending lengthwise thereof and arranged to contain a series of disks, a cover plate on said member and over said channel, said cover plate being provided with slots, a lever pivotally mounted adjacent to said cover plate, and pins projecting from said lever through said slots and into said channel whereby said series of disks are held and the terminal disk is released for discharge and whereby the succeeding disks are held against movement in said channel during the discharge of said terminal disk.

5. A feeder comprising a support, a channeled member adjustably mounted thereon, and provided with notches at opposite sides of said channel, a cover plate on said member and over said channel, said cover plate having slots in registry with said notches, a recessed housing mounted upon said cover plate, a bell-crank lever pivotally mounted on said housing and having one member located in said recess and the other member extending exteriorly of said housing and pins carried by said first named member of said bell-crank lever and projecting through said slots of the cover plate, said pins being arranged so that when one pin extends into a notch, the other extends into said channel and vice versa.

In testimony whereof I have hereunto set my hand.

WILLIAM ERHARD.